(12) United States Patent
Zhang

(10) Patent No.: US 11,956,558 B2
(45) Date of Patent: Apr. 9, 2024

(54) PHOTOGRAPHING METHOD AND DEVICE

(71) Applicant: ZTE CORPORATION, Shenzhen (CN)

(72) Inventor: Xiaoliang Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/760,399

(22) PCT Filed: Jan. 25, 2021

(86) PCT No.: PCT/CN2021/073595
§ 371 (c)(1),
(2) Date: Aug. 9, 2022

(87) PCT Pub. No.: WO2021/196839
PCT Pub. Date: Oct. 7, 2021

(65) Prior Publication Data
US 2023/0081173 A1 Mar. 16, 2023

(30) Foreign Application Priority Data
Apr. 3, 2020 (CN) .......................... 202010258634.2

(51) Int. Cl.
*H04N 25/76* (2023.01)
*G09G 3/32* (2016.01)
(Continued)

(52) U.S. Cl.
CPC ............ *H04N 25/76* (2023.01); *H04N 25/77* (2023.01); *H04N 25/772* (2023.01)

(58) Field of Classification Search
CPC ...... H04N 25/76; H04N 25/772; H04N 25/77; H04N 23/57; H04N 23/63; H04N 23/631;
(Continued)

(56) References Cited

U.S. PATENT DOCUMENTS 9,549,134 B2 * 1/2017 Suh ...................... G09G 3/3406
2011/0285734 A1 * 11/2011 Shiohara .............. G09G 3/3611
345/581

(Continued)

FOREIGN PATENT DOCUMENTS

CN 105094307 A 11/2015
CN 106601188 A 4/2017
(Continued)

OTHER PUBLICATIONS

European Patent Office. Extended European Search Report for EP Application No. 21780101.8, dated Apr. 4, 2023, pp. 1-9.

(Continued)

*Primary Examiner* — Marly S Camargo
(74) *Attorney, Agent, or Firm* — Vivacqua Crane, PLLC

(57) ABSTRACT

A photographing method, an electronic device, and a storage medium are disclosed. The photographing method includes: upon reception of a camera startup instruction, executing alternated steps of displaying an image on a display screen and acquiring an image with a camera, the alternated steps including setting the display screen into a transparent state after the display screen displays a frame of image; controlling the under-panel camera to acquire a frame of image, and sending the acquired image to the display screen for display; and returning to execute the alternated steps until an end instruction indicating completion of photographing is received. When the display screen is in the transparent state, light is allowed to enter the under-panel camera through the display screen.

18 Claims, 3 Drawing Sheets

(51) Int. Cl.

| | |
|---|---|
| *G09G 5/00* | (2006.01) |
| *H04M 1/02* | (2006.01) |
| *H04N 23/57* | (2023.01) |
| *H04N 23/63* | (2023.01) |
| *H04N 25/77* | (2023.01) |
| *H04N 25/772* | (2023.01) |
| *H10K 59/10* | (2023.01) |
| *H10K 59/12* | (2023.01) |

(58) Field of Classification Search
CPC .. G09G 5/00; G09G 3/00–3208; H10K 59/65; H10K 59/10; H10K 59/12; H04M 1/72454; H04M 1/0264; H04M 1/0266; H04M 2250/52
See application file for complete search history.

(56) References Cited

U.S. PATENT DOCUMENTS

| | | | |
|---|---|---|---|
| 2013/0182062 A1 | 7/2013 | Son et al. | |
| 2014/0104290 A1* | 4/2014 | Kwa | G09G 5/36 345/545 |
| 2017/0124932 A1 | 5/2017 | Evans et al. | |
| 2020/0227005 A1* | 7/2020 | Zhang | G09G 5/10 |
| 2020/0412898 A1* | 12/2020 | Onuma | G09G 5/12 |
| 2023/0350222 A1* | 11/2023 | Castelman | G09G 3/005 |

FOREIGN PATENT DOCUMENTS

| | | |
|---|---|---|
| CN | 108989497 A | 12/2018 |
| CN | 109889628 A | 6/2019 |
| CN | 110581910 A | 12/2019 |
| KR | 20130078236 A | 7/2013 |

OTHER PUBLICATIONS

Intellectual Property India. Examination Report for IN Application No. 202227047753 and English translation, dated Dec. 12, 2022, pp. 1-7.

International Searching Authority. International Search Report and Written Opinion for PCT Application No. PCT/CN2021/073595 and English translation, dated Apr. 16, 2021, pp. 1-9.

* cited by examiner

PHOTOGRAPHING METHOD AND DEVICE

CROSS-REFERENCE TO RELATED APPLICATIONS

This application is a national stage filing under 35 U.S.C. § 371 of international application number PCT/CN2021/073595, filed Jan. 25, 2021, which claims priority to Chinese patent application No. 202010258634.2 filed Apr. 3, 2020. The contents of these applications are incorporated herein by reference in their entirety.

TECHNICAL FIELD

Embodiments of the disclosure relate to the field of data processing, and in particular to a photographing method, an electronic device, and a storage medium.

BACKGROUND

With the development of intelligent terminals, the requirement on the screen-to-body ratio of intelligent terminals is getting higher and higher. The screen-to-body ratio of an intelligent terminal can be maximized by arranging an under-panel camera under a preset area of a display screen of the intelligent terminal, which has become an important development direction of intelligent terminals. When a user turns on the under-panel camera for photographing, the area corresponding to the under-panel camera is set not to display contents, so that light can enter the camera through this area, thus achieving the photographing function of the camera. The area corresponding to the under-panel camera is usually black when no content is displayed.

The inventor discovered that in some cases, when photographing is performed using the under-panel camera, the area corresponding to the under-panel camera is black, and if the preset area and the under-panel camera are arranged in the central area of the display screen, a black area will appear at the center of a displayed picture during photographing, seriously affecting the display effect of the picture. Therefore, the under-panel camera is usually arranged in an edge area of the display screen, which leads to an inflexible arrangement of the under-panel camera of the intelligent terminal.

SUMMARY

Embodiments of the disclosure provide a photographing method, an electronic device, and a storage medium, which enables an under-panel camera to be flexibly arranged at any position under a display screen.

In order to solve the aforementioned technical problems, an embodiment of the disclosure provides a photographing method, including: in response to reception of a camera startup instruction, executing alternated steps of displaying an image on a display screen and acquiring an image with a camera; the alternated steps including: setting the display screen into a transparent state after the display screen displays an image, where light is allowed to enter an under-panel camera through the display screen in case that the display screen is in the transparent state; controlling the under-panel camera to acquire an image, and sending the acquired image to the display screen for display; and returning to execute the alternated steps until an end instruction indicating completion of photographing is received.

An embodiment of the disclosure further provides an electronic device, including: a display screen, an under-panel camera, at least one processor, and a memory in communicative connection with the at least one processor. The memory stores instructions executable by the at least one processor which, when executed by the at least one processor, cause the at least one processor to carry out the aforementioned photographing method.

An embodiment of the disclosure further provides a computer-readable storage medium, storing a computer program which, when executed by a processor, causes the processor to carry out the aforementioned photographing method.

BRIEF DESCRIPTION OF DRAWINGS

Exemplary description will be made for one or more embodiments with reference to the figures in the corresponding accompanying drawings without constituting a limitation to the embodiments. Elements with the same reference numeral in the accompanying drawings represent similar elements, and unless stated otherwise, the figures in the accompanying drawings do not constitute a scale limitation.

Figure 1:
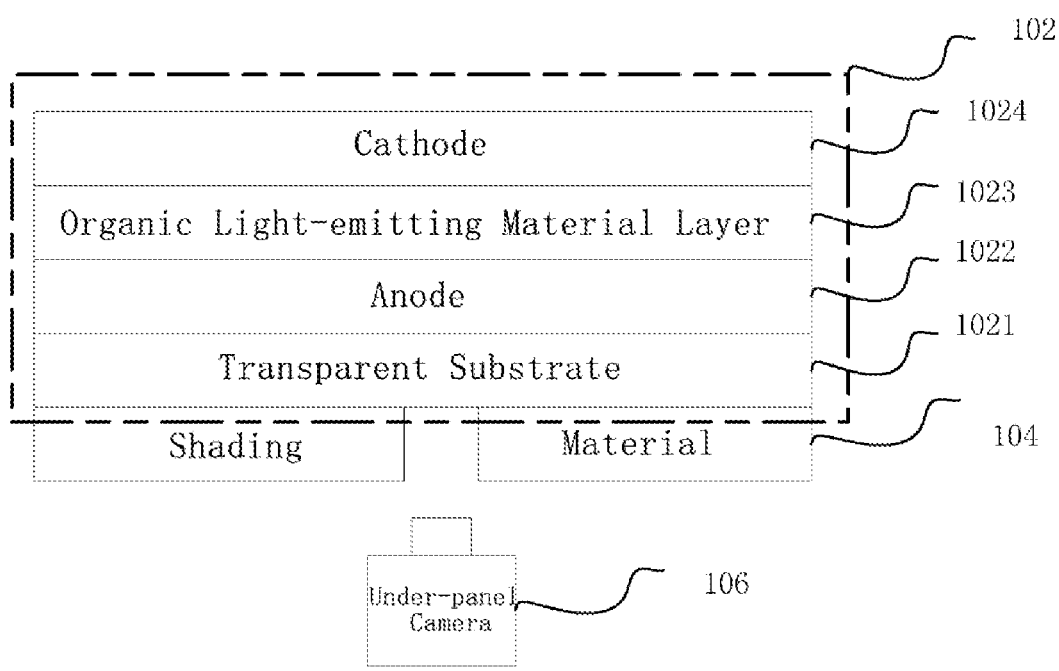
FIG. 1 is a schematic diagram of a display device to which a photographing method is applied in an embodiment.

| Reference numerals: | |
|---|---|
| 102: display screen; | 1021: transparent substrate; |
| 1022: anode; | 1023: organic light-emitting material layer; |
| 1024: cathode; | 104: shading material; |
| 106: under-panel camera. | |

DETAILED DESCRIPTION

In order to make the object, technical schemes and advantages of the embodiments of the disclosure clearer, each embodiment of the disclosure will be set forth in detail hereinafter with reference to the accompanying drawings. However, those of ordinary skill in the art can understand that many technical details are put forward in each embodiment of the disclosure in order for readers to better understand the disclosure. However, even without these technical details and various changes and modifications based on the following embodiments, the technical schemes claimed in the disclosure can still be implemented. The division of the following embodiments is intended to facilitate description, and should not constitute any limitation to the implementations of the disclosure. All the embodiments may be combined with and referred to one another under the premise of no contradiction.

FIG. 1 is a schematic diagram of a display device to which a photographing method is applied, according to an embodiment of the disclosure. As shown in FIG. 1, this scenario includes a display screen 102, a shading material 104, and an under-panel camera 106. The shading material 104 is attached under the display screen 102, and a preset area of the shading material 104 is grooved to obtain a partially grooved shading material 104. The under-panel camera 106 is arranged under the preset area of the shading material 104. When no content is displayed on an area of the display screen 102 corresponding to the preset area of the shading material 104, light can enter the under-panel camera 106 through the display screen, so that the under-panel camera 106 can perform photographing.

When photographing is performed using the under-panel camera 106, the area of the display screen 102 not displaying contents usually appears black, that is, the area of the display screen 102 corresponding to the preset area of the shading material 104 appears black. If the preset area is arranged in a central area of the display screen, a black area will appear at the center of a displayed picture during photographing, seriously affecting the display effect of the picture. Therefore, the under-panel camera is typically arranged in an edge area of the display screen, which leads to an inflexible arrangement of the under-panel camera.

Alternatively, the display screen is an active-matrix organic light-emitting diode (AMOLED). As shown in FIG. 1, the AMOLED may include:

(1) a transparent substrate 1021, typically made of glass or plastic;

(2) an anode 1022, typically made of a transparent conductive material of indium tin oxides (ITO) and configured for providing "holes" for an organic light-emitting material layer;

(3) an organic light-emitting material layer 1023, typically composed of organic light-emitting material molecules, where when the organic light-emitting material layer 1023 is driven by an external voltage, electrons injected by a cathode and the holes injected by the anode are combined in the light-emitting layer to form excitons, and excitons radiactively de-excite to emit photons, generating visible light; and (4) a cathode 1024, typically made of a transparent conductive material and configured for providing electrons for the organic light-emitting material layer.

The shading material 104, which is attached under the transparent substrate 1021, may be shading foam, and a light-transmitting area is formed by partially perforating the shading foam, so that light can pass through the cathode 1024, the organic light-emitting layer 1023, the anode 1022, the substrate 1021 and the perforated area of the shading material 104 to get into the under-panel camera 106.

Figure 2:
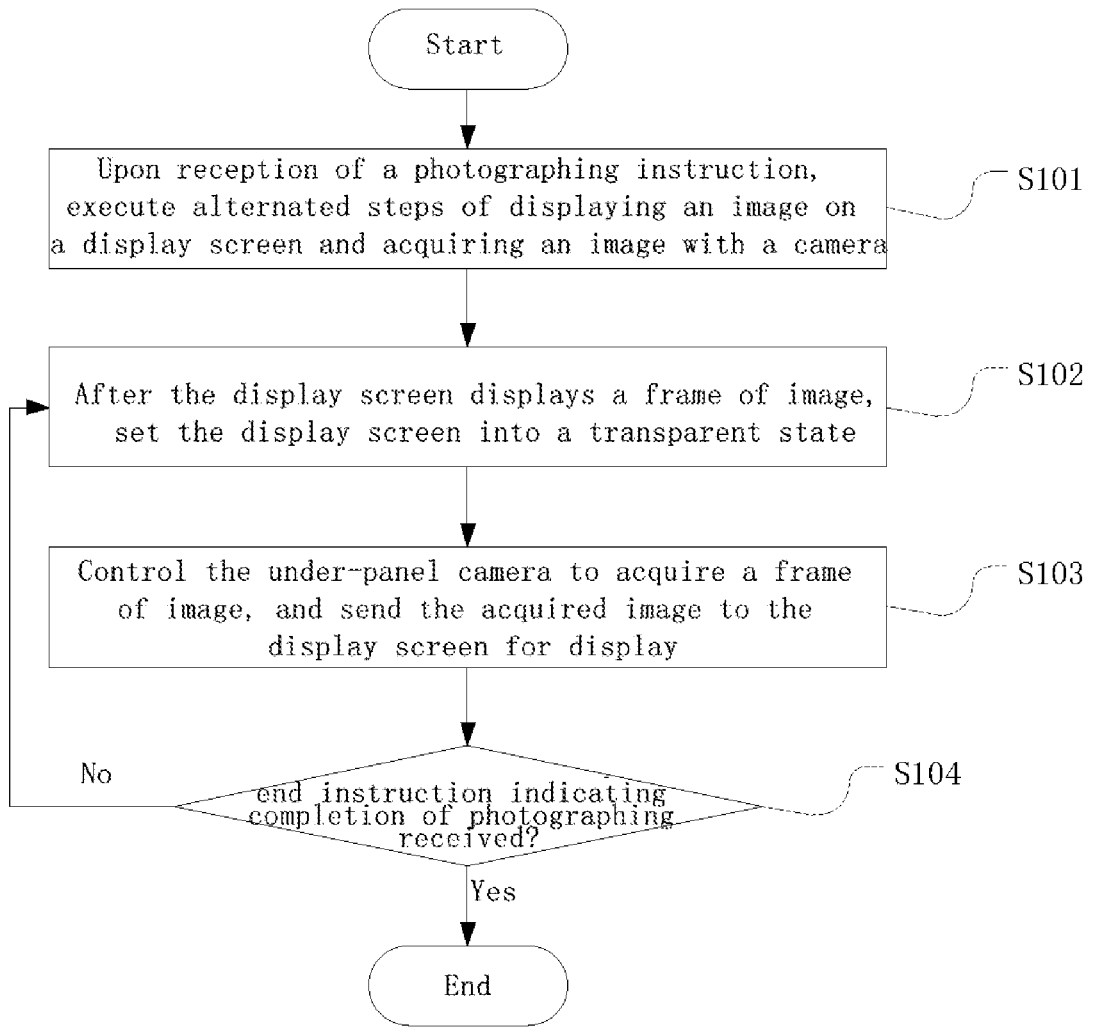
FIG. 2 is a schematic flowchart of a photographing method in an embodiment.

FIG. 2 is a schematic flowchart of a photographing method in an embodiment. In this embodiment, when a camera startup instruction is received, an electronic device performs alternated steps of displaying an image on the display screen and acquiring an image with the camera, so that no black area will appear on the display screen when an image is displayed and the arrangement of the under-panel camera in any area of the display screen will not affect the display effect of a picture. The details of implementation of a subfield division method of the present embodiment will be described below. The following contents are merely the details of implementation provided to facilitate understanding, and are not necessary for the implementation of this scheme. As shown in FIG. 2, the method includes steps S101 to S104.

At S101, after a camera startup instruction is received, alternated steps of displaying an image on a display screen and acquiring an image with a camera are executed.

The camera startup instruction may be used to instruct the electronic device to start photographing by means of the under-panel camera. The camera startup instruction may be at least one of a voice instruction, a touch instruction and a text instruction, which is not limited herein. When receiving the camera startup instruction, the electronic device may perform photographing by executing the alternated steps of displaying an image on the display screen and acquiring an image with the camera. The electronic device may immediately execute the aforementioned alternated steps when receiving the camera startup instruction, or execute the aforementioned alternated steps after displaying a preview image through the display screen first, which is not limited herein. The alternated steps include the following steps.

At S102, after displaying an image, the display screen is set into a transparent state.

When the display screen displays images, multiple frames of images are typically displayed per second according to a display refresh rate of the display screen. For example, if the display refresh rate of the display screen indicates that the display screen displays 120 frames of images per second, the duration occupied by each frame of image is $1/120$ second, that is, the display screen can display a frame of image in $1/120$ second. After completing the display of an image, the display screen may be set into the transparent state. When the display screen is set into the transparent state, light can enter the under-panel camera through the display screen, to allow the under-panel camera to perform photographing. It should be noted that when the display screen is in the transparent state, it may mean that part of the display screen or the whole display screen is in a state of not displaying contents, which is not limited herein. For example, when the display screen is in the transparent state, it may mean that the area of the display screen corresponding to the under-panel camera does not display content, and usually appears black. It should be noted that the electronic device may set the display screen into the transparent state through a display screen integrated circuit (IC) or a processor, which is not limited herein.

At S103, the under-panel camera is controlled to acquire an image, and the acquired image is sent to the display screen for display.

When the display screen is set into the transparent state, light can enter the under-panel camera through the display screen, to allow the under-panel camera to perform photographing to acquire an image. In this case, the under-panel camera is controlled to acquire a frame of image, and then the image acquired by the under-panel camera is sent to the display screen for the display screen to display the acquired preview image. It should be noted that when the image acquired by the under-panel camera is sent to the display screen for display, the acquired image may be directly sent to the display screen for display through the under-panel camera, or the under-panel camera sends the acquired image to a processor of the electronic device and the processor sends the image to the display screen for display, which is not limited herein.

At S104, the alternated steps are executed until an end instruction indicating completion of photographing is received.

After the image acquired by the under-panel camera is sent to the display screen for display, the aforementioned alternated steps are executed, that is, the aforementioned steps of displaying an image on the display screen and acquiring an image with the camera are alternately executed. Typically, it will take a very short time (e.g. $1/120$ second) for the display screen to display a frame of image and for the under-panel camera to acquire an image. By executing the alternated steps of displaying an image on the display screen and acquiring an image with the camera, e.g. displaying an image in the $1/120^{th}$ second, acquiring an image with the under-panel camera in the $2/120^{th}$ second, displaying the image in the $3/120^{th}$ second, acquiring an image with the under-panel camera in the $4/120^{th}$ second and so on, i.e. quick switching between the image displaying by the display screen and image acquiring by the camera, the user's eyes cannot notice the switching of contents displayed by the display screen when observing a photographing interface. The end instruction is used to indicate the completion of photographing. The end instruction may be at least one of a voice instruction, a touch instruction and a text instruction, which is not limited herein. When the end instruction is received, the electronic device stops executing the aforementioned alternated steps. The electronic device may immediately stop executing the aforementioned alternated steps when receiving the end instruction, or stop executing the aforementioned alternated steps after displaying a frame of end preview image through the display screen first, which is not limited herein.

Generally, if the number of frames of images displayed by the display screen within one second is greater than a threshold, the human eyes will not perceive the flicker of the display screen when observing the display screen. By alternately executing the steps of displaying an image on the display screen and acquiring an image with the camera, the number of frames of images displayed by the display screen will not be less than the aforementioned threshold, achieving the function of displaying images on the display screen in the process of photographing. For example, if the display refresh rate of the display screen indicates that the display screen displays 120 frames of images per second, by alternately executing the steps of displaying an image on the display screen and acquiring an image with the camera, the number of frames of images displayed by the display screen within one second is 60, the number of frames of images acquired by the camera within one second is 60, and the aforementioned threshold is generally 50 frames, that is, the number (60) of frames of images displayed by the display screen within one second is greater than the threshold (50), and in this case, the human eyes will not perceive the flicker of the display screen.

In this embodiment, compared with the existing technology, during photographing by the under-panel camera, after a frame of image is displayed by the display screen, the display screen is set into the transparent state, to allow the under-panel camera to acquire an image by means of light transmitted through the display screen. Then, the acquired image is sent to the display screen for display. Meanwhile, during photographing, the steps of displaying an image on the display screen and acquiring an image with the camera are alternately executed, so that no black area will appear on the display screen when an image is displayed. Therefore, the arrangement of the under-panel camera in any area of the display screen will not affect the display effect of a picture, that is, the flexibility of the arrangement of the under-panel camera can be increased.

In an embodiment, when the display screen needs to be set into the transparent state, the display screen may be set into the transparent state by a display screen integrated circuit (IC). After the display screen is set into the transparent state by the display screen IC, a confirmation signal used to indicate that the display screen is in the transparent state may be sent to the processor. After receiving the aforementioned confirmation signal, the processor controls the under-panel camera to acquire data. The embodiment shown in FIG. 3 will be described in detail below.

Figure 3:
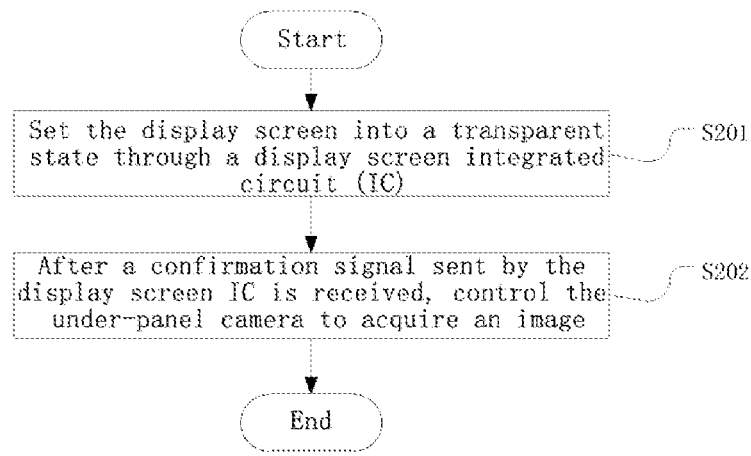
FIG. 3 is a schematic flowchart of a photographing method in an embodiment.

As shown in FIG. 3, the method further includes steps S201 to S202.

At S201, the display screen is set into the transparent state by the display screen IC.

The display screen IC may be an integrated circuit arranged on the display screen. The display screen IC may set the display screen to the transparent state by setting a level of signals of a signal source of the display screen to be less than a preset low-level threshold and setting a level of gate signals of the display screen to be greater than a preset high-level threshold. For example, the display screen IC may set the level of source signals to 0V and the level of gate signals to 5V, so that the display screen can be in the transparent state.

At S202, after receiving a confirmation signal sent by the display screen IC, the under-panel camera is controlled to acquire an image, where the confirmation signal is used to indicate that the display screen is in the transparent state.

The confirmation signal is used to indicate that the display screen is in the transparent state. The display screen IC may generate the aforementioned confirmation signal after confirming that the display screen has completed image display. When the display screen completes the display of a frame of image, all pixels on the display screen are lit up, i.e. activated. The display screen IC can detect whether or not pixels on the display screen are activated, and when the pixels on the display screen are activated, the display screen IC can generate a confirmation signal which is used to indicate that the display screen has completed the display of a frame of image, and send the confirmation signal to the processor of the electronic device, so that the processor of the electronic device can set the display screen into the transparent state after receiving the confirmation signal. Alternatively, the aforementioned confirmation signal is generated when the display screen IC detects that target pixels on the display screen are activated. The target pixels may be all or part of the pixels on the display screen, which is not limited herein. Alternatively, the target pixels are a last row of pixels on the display screen.

According to the photographing method, after the confirmation signal sent by the display screen IC is received, the display screen is set into the transparent state, and therefore the under-panel camera can only set the display screen into the transparent state after a determination is made that the display screen has completed the display of a current frame of image, thus avoiding black screen of the display screen as a result of the display screen being set into a black transparent state when the display screen has not complete the display of the image, increasing the reliability of the display screen in displaying images. For example, the display screen IC sends a confirmation signal to the processor when the target pixels are activated, that is, the confirmation signal can more accurately reflect that the display screen has completed the display of an image, further avoiding the situation that the under-panel camera sets the display screen into the black transparent state when the display screen has not complete the display of an image, thereby further increasing the reliability of the display screen in displaying images. For example, when the target pixels are the last row of pixels on the display screen, i.e. part of the pixels on the display screen, the number of pixels to be detected is small in determination of whether or not the target pixels on the display screen are activated, thus increasing the efficiency of determining the confirmation signal.

In an embodiment, the executing body is the processor of the electronic device, and the aforementioned alternated steps may be alternately executed at a preset acquisition time and a preset display time. Alternatively, at the preset acquisition time, the under-panel camera is controlled to acquire a frame of image, and at the preset display time, the acquired frame of image is sent to the display screen for display. The preset acquisition time alternates with the preset display time.

The alternation of the preset acquisition time and the preset display time may be the alternation of one preset acquisition time and one preset display time, the alternation of multiple preset acquisition times and multiple preset display times, or the alternation of one preset acquisition time and multiple preset display times, which is not limited herein. For example, if the alternation of the preset acquisition time and the preset display time is the alternation of one preset acquisition time and one preset display time, a time interval between a preset acquisition time and an adjacent preset display time is the duration of displaying a frame of image. It is assumed that the duration taken by a frame of image is $1/60$ second, the preset acquisition time is $1/60^{th}$ second, $3/60^{th}$ second, $5/60^{th}$ second and so on, and the preset display time is $2/60^{th}$ second, $4/60^{th}$ second, $6/60^{th}$ second and so on. A frame of image acquired by the under-panel camera at the $1/60^{th}$ second is displayed by the display screen at the $2/60^{th}$ second; a frame of image acquired by the under-panel camera at the $3/60^{th}$ second is displayed by the display screen at the $4/60^{th}$ second; a frame of image acquired by the under-panel camera at the $5/60^{th}$ second is displayed by the display screen at the $6/60^{th}$ second, and so on. For another example, if the alternation of the preset acquisition time and the preset display time is the alternation of one preset acquisition time and multiple preset display times and the duration taken by a frame of image is $1/60$ second, the preset acquisition time is $1/60^{th}$ second, $4/60^{th}$ second, $7/60^{th}$ second and so on, and the preset display times are $2/60^{th}$ second and $3/60^{th}$ second, $5/60^{th}$ second and $6/60^{th}$ second, $8/60^{th}$ second and $9/60^{th}$ second and so on. A frame of image acquired by the under-panel camera at the $1/60^{th}$ second is displayed by the display screen at the $2/60^{th}$ second and the $3/60^{th}$ second respectively; a frame of image acquired by the under-panel camera at the $4/60^{th}$ second is displayed by the display screen at the $5/60^{th}$ second and the $6/60^{th}$ second respectively; a frame of image acquired by the under-panel camera at the $7/60^{th}$ second is displayed by the display screen at the $8/60^{th}$ second and the $9/60^{th}$ second respectively, and so on.

In the aforementioned photographing method, by directly setting the preset display time and the preset acquisition time to be alternated, in the process of photographing, the under-panel camera is controlled to acquire an image at the preset acquisition time and the acquired image is displayed by the display screen at the preset display time, thus avoiding the signal interaction between the processor and the display screen IC, increasing the convenience of photographing.

In an example, after receiving a camera startup instruction, the electronic device may also increase the display refresh rate of the display screen, so that the number of frames of images displayed by the display screen will not sharply drop due to the number of frames occupied by the under-panel camera acquiring images. Alternatively, the display refresh rate of the display screen is increased to obtain an updated display refresh rate. The display refresh rate is used to indicate the number of frames of images displayed per unit time.

The updated display refresh rate is higher than the initial display refresh rate, so when the alternated steps of displaying an image on the display screen and acquiring an image with the camera are executed, the number of frames occupied by the display screen displaying images will not decrease sharply. Generally, the electronic device increases the display refresh rate of the display screen by means of a timing controller. In a possible case, alternatively, the updated display refresh rate is twice the initial display refresh rate. In this case, the number of frames occupied by the display screen displaying images is the same as the number of frames occupied by displaying images when the aforementioned alternated steps are not executed.

In the aforementioned photographing method, by increasing the display refresh rate of the display screen, the number of frames occupied by the display screen displaying images will not drop sharply due to the number of frames occupied by the under-panel camera acquiring images, thus avoiding the poor display effect caused by insufficient number of image frames displayed on the display screen.

It should be noted that the aforementioned examples are illustrative for easy understanding rather than constitutes a limitation to the technical scheme of the disclosure.

Division of the steps in the above various methods is merely to make description clear, and during implementation, the steps may be combined into one step or certain steps may be divided into a plurality of steps, both of which shall fall into the protection scope of the present patent as long as the same logic relation is contained. Inessential modifications or designs which are added or introduced into the algorithm or the flow without changing the core designs of the algorithm and the flow shall fall into the protection scope of the present patent.

Figure 4:
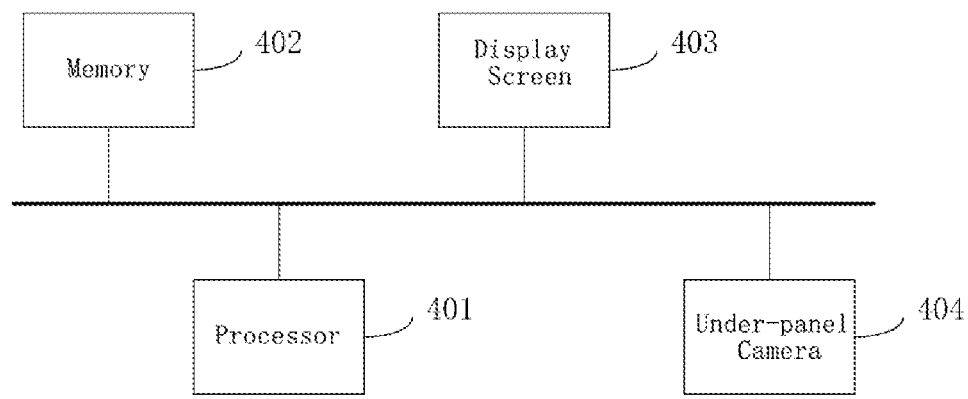
FIG. 4 is a schematic structural diagram of an electronic device in an embodiment.

Another embodiment of the disclosure relates to an electronic device. As shown in FIG. 4, the electronic device includes: at least one processor 401; a memory 402 in communicative connection with the at least one processor 401; a display screen 403; and an under-panel camera 404. The memory 402 stores instructions executable by the at least one processor 401 which, when executed by the at least one processor 401, cause the at least one processor 401 to execute the method steps shown in the aforementioned method embodiments. The display screen 403 is configured for displaying images. The under-panel camera 404 is configured for acquiring images.

The memory 402 and the processor 401 are connected via a bus. Any number of interconnected buses and bridges may be included. The bus connects various circuits of the one or more processors 401 and the memory 402 together. The bus may also connect various other circuits such as a peripheral device, a voltage regulator, a power management circuit, etc., which are well-known in the art and therefore will not be further described herein. A bus interface provides an interface between the bus and a transceiver. The transceiver may be one component or multiple components (such as multiple receivers and transmitters), providing a unit for communicating with various other apparatuses on a transmission medium. Data processed by the processor 401 are transmitted on a wireless medium through an antenna. For example, the antenna also receives data and transmits the data to the processor 401.

The processor 401 is responsible for managing the bus and conventional processing, and can also provide various functions, including timing, peripheral interfaces, voltage regulation, power management and other control functions. The memory 402 may be configured to store data which is used by the processor 401 when performing operations.

In an embodiment, the aforementioned under-panel camera 404 is arranged under a preset area of the display screen 403, and a distance between the preset area and an edge of the display screen is not less than a preset threshold.

According to the electronic device, when the under-panel camera is arranged in a central area which is at a distance from the edge of the display screen not less than the preset threshold, the user's line of sight can face the central area of the display screen when the user is making a video call or taking a selfie, thus improving the interactive experience in taking a video call or taking a selfie.

Another embodiment of the disclosure relates to a computer-readable storage medium, storing a computer program which, when executed by the processor, causes the processor to implement the aforementioned method embodiments.

That is, those having ordinary skill in the art may understand that all or part of the steps in the methods for implementing the aforementioned embodiments may be carried out by related hardware instructed by a program. The program is stored in a storage medium and includes a plurality of instructions to cause a device (such as a single chip, a chip or the like) or a processor to execute all or part of the steps of the method described in each embodiment of the disclosure. The aforementioned storage medium includes a USB flash disk, a mobile hard disk, a read-only memory (ROM), a random access memory (RAM), a magnetic disk, an optical disk, or various other media capable of storing program codes.

Those having ordinary skill in the art should understand that the aforementioned embodiments are the embodiments implementing the disclosure. However, in practical application, various changes can be made to the embodiments in terms of forms and details without departing from the protection scope of the disclosure.

The invention claimed is:

1. A photographing method, comprising:
   in response to reception of a camera startup instruction, executing alternated steps of displaying an image on a display screen and acquiring an image with a camera;
   the alternated steps comprising:
      setting the display screen into a transparent state after the display screen displays an image, wherein light is allowed to enter an under-panel camera through the display screen in case that the display screen is in the transparent state;
      controlling the under-panel camera to acquire an image, and sending the acquired image to the display screen for display; and
      returning to execute the alternated steps until an end instruction indicating completion of photographing is received;
         wherein after reception of a camera startup instruction, the method further comprises:
            increasing a display refresh rate of the display screen to obtain an updated display refresh rate, the display refresh rate being used to indicate a number of frames of images displayed per unit time.

2. The photographing method of claim 1, wherein
   the setting the display screen into a transparent state comprises:
      setting, by a display screen integrated circuit (IC), the display screen into a transparent state; and
   the controlling the under-panel camera to acquire an image comprises:
      in response to reception of a confirmation signal sent by the display screen IC, controlling the under-panel camera to acquire an image, the confirmation signal being used to indicate that the display screen is in the transparent state.

3. The photographing method of claim 2, wherein the confirmation signal is generated in response to the display screen IC detecting that target pixels on the display screen are activated.

4. The photographing method of claim 3, wherein the target pixels are a last row of pixels on the display screen.

5. The photographing method of claim 1, wherein
   the controlling the under-panel camera to acquire an image comprises:
      controlling the under-panel camera to acquire an image at a preset acquisition time;
   the sending the acquired image to the display screen for display comprises:
      sending the acquired image to the display screen for display at a preset display time, the preset acquisition time being alternated with the preset display time.

6. The photographing method of claim 1, wherein the updated display refresh rate is twice an initial display refresh rate.

7. The photographing method of claim 1, wherein the display screen is an active-matrix organic light-emitting diode (AMOLED).

8. An electronic device, comprising: a display screen, an under-panel camera, at least one processor; and a memory in communicative connection with the at least one processor; wherein:
   the memory is configured for storing instructions executable by the at least one processor which, when executed by the at least one processor, cause the at least one processor to execute a photographing method comprising:
      in response to reception of a camera startup instruction, executing alternated steps of displaying an image on a display screen and acquiring an image with a camera;
      the alternated steps comprising:
         setting the display screen into a transparent state after the display screen displays an image, wherein light is allowed to enter an under-panel camera through the display screen in case that the display screen is in the transparent state;
         controlling the under-panel camera to acquire an image, and sending the acquired image to the display screen for display; and
         returning to execute the alternated steps until an end instruction indicating completion of photographing is received;
         wherein after reception of a camera startup instruction, the method further comprises:
            increasing a display refresh rate of the display screen to obtain an updated display refresh rate, the display refresh rate being used to indicate a number of frames of images displayed per unit time.

9. The electronic device of claim 8, wherein the under-panel camera is arranged under a preset area of the display screen, and a distance between the preset area and an edge of the display screen is not less than a preset threshold.

10. The electronic device of claim 8, wherein
   the setting the display screen into a transparent state comprises:
      setting, by a display screen integrated circuit (IC), the display screen into a transparent state; and
   the controlling the under-panel camera to acquire an image comprises:
      in response to reception of a confirmation signal sent by the display screen IC, controlling the under-panel camera to acquire an image, the confirmation signal being used to indicate that the display screen is in the transparent state.

11. The electronic device of claim 10, wherein the confirmation signal is generated in response to the display screen IC detecting that target pixels on the display screen are activated.

12. The electronic device of claim 11, wherein the target pixels are a last row of pixels on the display screen.

13. The electronic device of claim 8, wherein
the controlling the under-panel camera to acquire an image comprises:
controlling the under-panel camera to acquire an image at a preset acquisition time;
the sending the acquired image to the display screen for display comprises:
sending the acquired image to the display screen for display at a preset display time, the preset acquisition time being alternated with the preset display time.

14. The electronic device of claim 8, wherein the updated display refresh rate is twice an initial display refresh rate.

15. The electronic device of claim 8, wherein the display screen is an active-matrix organic light-emitting diode (AMOLED).

16. A non-transitory computer-readable storage medium, storing a computer program which, when executed by a processor, causes the processor to perform a photographing method comprising:
in response to reception of a camera startup instruction, executing alternated steps of displaying an image on a display screen and acquiring an image with a camera;
the alternated steps comprising:
setting the display screen into a transparent state after the display screen displays an image, wherein light is allowed to enter an under-panel camera through the display screen in case that the display screen is in the transparent state;
controlling the under-panel camera to acquire an image, and sending the acquired image to the display screen for display; and
returning to execute the alternated steps until an end instruction indicating completion of photographing is received;
wherein after reception of a camera startup instruction, the method further comprises:
increasing a display refresh rate of the display screen to obtain an updated display refresh rate, the display refresh rate being used to indicate a number of frames of images displayed per unit time.

17. The non-transitory computer-readable storage medium of claim 16, wherein
the setting the display screen into a transparent state comprises:
setting, by a display screen integrated circuit (IC), the display screen into a transparent state; and
the controlling the under-panel camera to acquire an image comprises:
in response to reception of a confirmation signal sent by the display screen IC, controlling the under-panel camera to acquire an image, the confirmation signal being used to indicate that the display screen is in the transparent state.

18. The non-transitory computer-readable storage medium of claim 17, wherein the confirmation signal is generated in response to the display screen IC detecting that target pixels on the display screen are activated.

* * * * *